United States Patent [19]

Double et al.

[11] Patent Number: 4,792,361

[45] Date of Patent: * Dec. 20, 1988

[54] CEMENTITIOUS COMPOSITE FRICTION COMPOSITIONS

[75] Inventors: David D. Double, Annapolis; Randall P. Bright, Bowie; Sean Wise, Millersville, all of Md.

[73] Assignee: Cemcom Corp., Lanham, Md.

[*] Notice: The portion of the term of this patent subsequent to May 19, 2004 has been disclaimed.

[21] Appl. No.: 894,815

[22] Filed: Aug. 8, 1986

[51] Int. Cl.$^4$ .................... C04B 14/00; C04B 14/02
[52] U.S. Cl. ........................................ 106/97; 106/36; 106/85; 106/104; 188/251 A; 192/107 M
[58] Field of Search .................. 106/36, 97, 104, 85; 188/251 A; 192/107 M

[56] References Cited

U.S. PATENT DOCUMENTS

| | | | |
|---|---|---|---|
| 1,967,224 | 7/1934 | Collier et al. | 106/36 |
| 3,967,037 | 6/1976 | Marzocchi et al. | 524/445 |
| 4,137,214 | 1/1979 | Sochalski | 106/36 |
| 4,388,423 | 6/1983 | Kaufman et al. | 523/153 |
| 4,482,385 | 11/1984 | Satkowski et al. | 106/97 |
| 4,501,830 | 2/1985 | Miller et al. | 106/97 |
| 4,666,520 | 5/1987 | Bright et al. | 106/97 |

*Primary Examiner*—Steven Capella
*Attorney, Agent, or Firm*—Lawrence I. Field

[57] ABSTRACT

Friction materials intended to be used as brake shoes, brake pads, and other brake components, comprising a composite in which one or more friction modifiers is embedded in a high strength cement matrix.

The matrix material exhibits a flexural strength of at least 1,500 psi, a compressive strength of at least about 15,000 psi and a flexural modulus of about $1 \times 10^6$ psi.

10 Claims, 2 Drawing Sheets

CEMENTITIOUS COMPOSITE FRICTION COMPOSITIONS

This invention relates to friction compositions which are generally comprised of friction modifiers such as particles and fillers embedded in a friction binder or matrix.

More particularly, the invention relates to cementitious composite friction materials which provide high performance, asbestos-free, relatively inexpensive compositions suitable for use as friction elements in such applications as brake shoes and disc brake pads and clutch plate faces for cars and light trucks, shoes and discs for railway use, and blocks, shoes or discs for heavy duty use and for aviation use.

Still more particularly, the invention relates to compositions comprising high strength inorganic cement binder materials and friction modifying filler materials or particles and to the manner in which such compositions are prepared.

Brake shoes composed of various fillers bonded by low strength inorganic cement binders have been described in the following United States Patents:

| Buell | 484,404 | issued October 18, 1892 |
|---|---|---|
| Laeufer et al | 818,833 | issued April 24, 1906 |
| Laeufer et al | 909,617 | issued January 12, 1909 |
| Norman | 943,157 | issued December 14, 1909 |
| Newman | 1,019,989 | issued March 12, 1912 |
| Steinbaugh | 1,076,325 | issued October 12, 1913 |
| Reid | 1,205,482 | issued November 21, 1916 |
| Laeufer | 1,724,718 | issued August 13, 1929 | and others of a similar nature.

With the adoption of synthetic resin binders and asbestos fillers, further development of such cement bonded friction materials appears to have been discontinued.

The art is in need of improved friction materials having performance and cost characteristics that exceed the properties and performance of existing friction materials. Desired improvements include higher heat stability, improved processability, machining and handling and lower cost.

An object of the invention is to provide a composition that satisfies the foregoing needs.

Another object of this invention is to provide a friction material which retains its effectiveness at the elevated temperatures encountered in normal service and which permits more extended service use as compared with friction materials in which the principal binder is a phenolic resin, such as those described in the prior art, for example in U.S. Pat. No. 3,879,338.

A further object of this invention is to provide a friction material having a matrix with a flexural strength in excess of 1,500 psi, a compressive strength in excess of 15,000 psi and a flexural modulus of about 1.0 million psi which when modified with suitable friction modifiers produces an acceptable braking effect with acceptable wear of the braking surfaces.

BRIEF DESCRIPTION OF THE DRAWINGS

These and other objects will be pointed out or will become apparent from the description which follows taken in conjunction with the drawings in which.

SUMMARY OF THE INVENTION

Figure 1A:
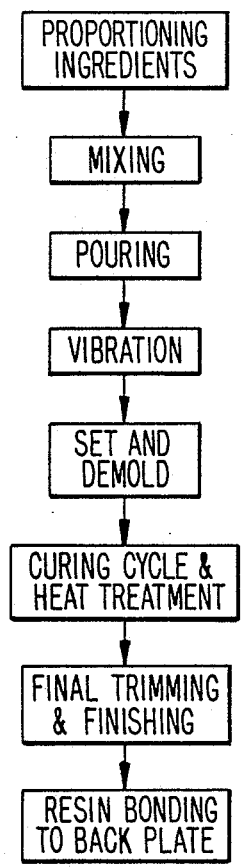
FIGS. 1A and 1B are flow sheets depicting two alternative processes for preparing the materials and FIGS. 2, 3 and 4 are test results for three of the brake compositions illustrative of the present invention and set forth in the examples which follow.
Figure 1B:
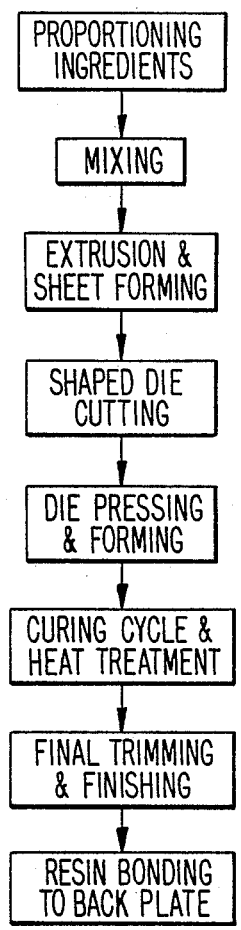

These and other objects of the invention are accomplished by the compositions of the invention which comprise:

(1) a high strength cement matrix material, and (2) one or more tribological additives which control the friction, wear, lubrication, and noise characteristics of the resulting composition.

DESCRIPTION OF EMBODIMENTS

Each of the constituents of the compositions of the invention and their preparation will now be described.

(1) Cement Matrix Materials

The friction binder useful in the present invention is a high strength cement, that is a cement which in the final composite exhibits a flexural strength of at least 1,500 psi, a compressive strength of about 15,000 psi or more and a flexural modulus of about 1.0 million psi.

A wide variety of inorganic cements may be used to develop the high strength matrix material in the composites of the present invention. Brake linings have been produced in which the tribological additives were embedded in matrix materials based on one or more of the following cements:

1. Silica Based Cements, e.g. Portland Cements
2. High Alumina Cements
3. Polymer Treated Cements (polymer modified cements, polymer impregnated cements)
4. Other mixtures of Cement forming Ceramic Oxides e.g. Lime, Silica, Alumina, Magnesia, Phosphate
5. Phosphate Based Cements Preferred high strength cements suitable for the present invention and their preparation are described in the following U.S. Pat. Nos. 4,353,748, 4,410,366, 4,482,385, 4,501,830, 4,505,753, the disclosures of which are incorporated herein by reference and in numerous other patents and publications.

The matrix materials useful in this invention also include the phosphate bonded matrix which may comprises the following:

|  | Weight % |
|---|---|
| Alumina Cement | 25–75 |
| Calcined Alumina | 8–35 |
| Sodium Hexametaphosphate | 8–25 |
| Magnesium Oxide | 0–66 |
| Water | 8–25 |

In addition to cement such as Portland Cement or High Alumina cement, the matrix material may include the additives disclosed in the five above noted U.S. Patents. For example, as described in Scheetz, U.S. Pat. No. 4,505,753 the cement is preferably Class H Portland Cement, mixed with Min-U-Sil[R], silica fume and a superplasticizer. As described in U.S. Pat. No. 4,410,366, the cement is a high alumina cement and a water dispersable or water soluble polymer or copolymer.

More specifically, useful matrix components include the following in the indicated proportions, it being understood that the total comprises about 60% of the composite:

|  | Broad | Narrow |
| --- | --- | --- |
| Class H Portland Cement | 0–40 | 15–35 |
| Min-U-Sil ® Silica | 0–20 | 13–17 |
| Silica Fume | 0–10 | 3–7 |
| Mighty 150 (Superplasticizer) | 0–3 | 2–2 |
| Water | 2–20 | 5–15 |
| Alumina Cement | 0–50 | 20–45 |
| Polyvinyl Alcohol/Acetate | 0–25 | 4–17 |
| Calcined Alumina | 0–30 | 4–20 |
| Sodium Hexametaphosphate | 0–25 | 10–20 |
| Magnesium Oxide | 0–50 | 10–50 |
| Polyethyleneimine | 0–5 | 0.5–2.0 |
| Wollastonite | 0–50 | 20–30 |
| Polyvinylpyrrolidone | 0–10 | 2–7 |

Tribological Additives

Virtually every manufacturer of brake linings has its own recipe or formulation for the composition it manufactures but in general these are comprised of the following principal classes of ingredients:

(1) Fibers for reinforcement, for wear and heat resistance and for control of friction performance;

(2) Dry lubricants to control friction coefficient, lower the wear and provide lubricity to the composition;

(3) Inorganic fillers such as inorganic powders and/or metal particles to improve wear resistance and thermal properties and to control frictional characteristics; and (4) Various organic fillers: e.g. rubber to control squeal and noise, and cashew nut shell resin for processing and desired friction qualities.

(1) Fibers

Fibers are a principal constituent in the friction modifying portion of the composition of this invention. A preferred material for the fibers is chopped steel wool, commercially available in short lengths (0.050"–0.5"). Various steels can be used but for reasons of availability and economy, wires or ribbons of plain carbon steels like SAE 1020 are suitable. Other metal fibers, such as copper or brass, mineral fibers such as glass, or synthetic resin fibers such as aramid fibers may be used in place of some or all of the steel fiber component. When steel fibers are used, the steel fibers usually comprise between 20% and 60% by weight of the friction composition.

(2) Dry lubricants

One or more of a variety of finely divided dry lubricants may be present in the composition including: graphite, petroleum coke, carbon black, molybdenum disulfide or sulfur. Suitable graphites are commercially available as synthetic graphite in powder form (−20 mesh). Suitable petroleum coke, carbon black and other dry lubricants are also commercially available. When used, the foregoing materials are usually present in amounts between 2.5 and 15% by weight of the friction composition.

(3) Inorganic Fillers

Other materials which may be included in the compositions of the present invention include both soft and hard inorganic filler materials and include relatively hard materials such as $Al_2O_3$, feldspar, MgO, $SiO_2$, SiC, and softer fillers such as barytes ($BaSO_4$), kaolin, talc, mica, iron oxide and litharge to provide better thermal conductivity and enchanced wear resistance, the composition may also include finely divided metallic materials such as iron, steel, copper, brass, zinc and the like e.g. as described in Rhee et al (BENDIX) U.S. Pat. No. 3,835,118, issued Sept. 10, 1974. Amounts of such materials up to about 25% by weight of the friction composition have been found beneficial in the friction materials of the present invention.

(4) Organic Fillers

A small amount of powdered nitrile rubber may be included to reduce squeal and other undesired noise in service. Powders of other rubbers such as SBR or butadiene rubbers can be substituted for the nitrile rubber. Another organic filler which may be present in the compositions of this invention intended for service as brake linings is cashew nut shell resin, described in U.S. Pat. No. 4,178,278. Other organic fillers known in the art may be provided for specific benefits. Up to about 5 weight percent of organic filler is generally employed based on the weight of friction composition.

The friction materials of this invention may be cast from the above components or may be formulated as described in the following description which is intended to illustrate one mode of practicing the present invention and is not intended to limit the same. It will be understood that depending on the specific formulation, minor variations may be made in the procedure followed in preparing specimens for testing.

All of the dry ingredients except for the fibers are dry blended. The fibers are added slowly while the mixture is being blended. After a suitable interval of mixing the material has been dry blended. Blending may be performed under vacuum, if desired. The liquids are then added and thoroughly mixed with the blended solids, again under vacuum if desired, until the material has become homogenous, and the desired consistency has been obtained. After extrusion, the material is cut, pressed or rolled into the desired shapes and thicknesses.

The extruded object is wrapped to prevent moisture loss, and placed between two platens to retain its shape while it is being cured.

After these procedures the material is tested for its flexural strength, modulus, and frictional properties.

EXAMPLES

The compositions of the following examples were prepared according to the above described procedure and cured as noted and then tested. The examples illustrate the invention but are not intended to limit it. In this specification and claims, unless specified otherwise, all parts and percentages are by weight and temperatures are in degrees celsius.

EXAMPLE 1

|  | Weight Percent | Volume Percent |
| --- | --- | --- |
| Matrix Material |  |  |
| Class H Portland Cement | 29.1 | 24.7 |
| Min-U-Sil ® Silica | 14.2 | 14.5 |
| Silica Fume | 4.0 | 4.8 |
| Mighty 150 (Superplasticizer) | 0.7 | 1.6 |
| Water | 9.1 | 24.2 |
| Friction Modifiers |  |  |
| Steel Fiber | 29.4 | 10.1 |
| Graphite | 9.1 | 11.1 |
| Petroleum Coke | 1.1 | 1.5 |
| Nitrile Rubber | 1.1 | 2.5 |
| Cashew Nut Shell Resin | 2.3 | 5.0 |
| Weight Ratio, Modifier to Matrix | 43:57 |  |
| Curing | 24 hours at 100% humidity, 20° C. |  |

-continued

|  | Weight Percent | Volume Percent |
|---|---|---|
|  | 24 hours at 100% humidity, 60° C. | |
|  | 48 hours at ambient conditions | |
|  | 17 hours at 200° C. | |
| Flexural Strength After cure | 3250 psi | |
| Modulus after cure | 1.5 × 10⁶ psi | |

When tested in a "F.A.S.T" tester, the cured composition exhibited braking properties which were adequate for many applications.

EXAMPLE 2

|  | Weight Percent | Volume Percent |
|---|---|---|
| Matrix Material | | |
| Alumina Cement | 30.5 | 9.5 |
| Polyvinyl Alcohol/Acetate | 6.0 | 13.2 |
| Calcined Alumina | 10.3 | 6.8 |
| Water | 11.9 | 31.4 |
| Friction Modifiers | | |
| Steel Fiber | 28.1 | 9.5 |
| Molybdenum Disulfide | 5.8 | 3.2 |
| Fused Magnesium Oxide | 2.2 | 1.6 |
| Barytes | 2.2 | 1.3 |
| Nitrile Rubber | 1.1 | 2.4 |
| Cashew Nut Shell Resin | 2.2 | 4.7 |
| Weight Ratio, Modifier to Matrix | 41:59 | |
| Curing | 24 hours at ambient conditions | |
|  | 15 hours oven drying at 125° C. | |
|  | 3 hours oven drying at 175° C. | |

When tested in a "F.A.S.T" tester, the cured composition exhibited braking properties which were adequate for many applications.

EXAMPLE 3

|  | Weight Percent | Volume Percent |
|---|---|---|
| Matrix Material | | |
| Alumina Cement | 28.2 | 21.6 |
| Polyvinyl Alcohol/Acetate | 11.1 | 22.0 |
| Calcined Alumina | 9.5 | 5.6 |
| Water | 11.0 | 26.1 |
| Friction Modifiers | | |
| Steel Fiber | 26.0 | 7.9 |
| Graphite | 8.4 | 9.0 |
| Petroleum Coke | 1.0 | 1.2 |
| Nitrile Rubber | 1.0 | 2.1 |
| Carbon Black | 3.8 | 4.6 |
| Weight Ratio, Modifier to Matrix | 40:60 | |
| Curing | 24 hours at ambient conditions | |
|  | 15 hours oven drying at 125° C. | |
|  | 3 hours oven drying at 175° C. | |
| Flexural Strength After cure | 2680 psi | |
| Modulus after cure | 1.0 × 10⁶ psi | |

Figure 2:
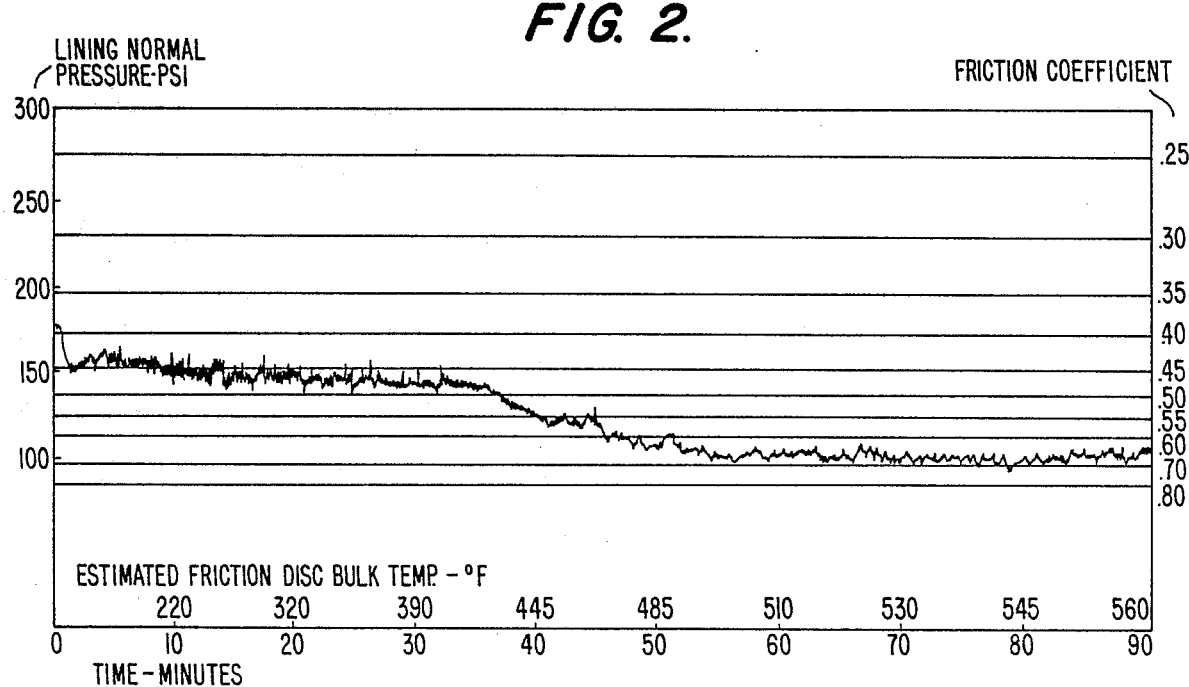

FIG. 2 is a graph showing the braking properties of this composition when tested in a "F.A.S.T." tester.

When tested on a 1985 automobile, the cured composition exhibited braking properties adequate for the car.

EXAMPLE 4

|  | Weight Percent | Volume Percent |
|---|---|---|
| Matrix Material | | |
| Sodium Hexametaphosphate | 14.6 | 16.0 |
| Alumina Cement (Secar 71) | 28.3 | 25.0 |
| Magnesium Oxide | 14.1 | 10.7 |
| Water | 8.8 | 24.0 |
| Friction Modifiers | | |
| Steel Fiber | 22.2 | 7.8 |
| Graphite | 7.2 | 8.9 |
| Petroleum Coke | 0.9 | 1.2 |
| Nitrile Rubber | 0.9 | 1.9 |
| Carbon Black | 3.3 | 4.5 |
| Weight Ratio, Modifier to Matrix | 34:66 | |
| Curing | 24 hours at ambient conditions | |
|  | 15 hours oven drying at 80° C. | |
|  | 15 hours oven drying at 125° C. | |
|  | 15 hours oven drying at 200° C. | |
|  | 15 hours oven drying at 400° C. | |
| Flexural Strength After cure | 3270 psi | |

EXAMPLE 5

|  | Weight Percent | Volume Percent |
|---|---|---|
| Matrix Material | | |
| Sodium Hexametaphosphate | 15.3 | 16.1 |
| Alumina Cement | 27.5 | 23.3 |
| Calcined Alumina | 9.2 | 6.1 |
| Water | 11.5 | 30.3 |
| Friction Modifiers | | |
| Steel Fiber | 23.5 | 7.9 |
| Graphite | 7.6 | 9.1 |
| Petroleum Coke | 0.9 | 1.2 |
| Nitrile Rubber | 0.9 | 2.0 |
| Carbon Black | 3.5 | 4.2 |
| Weight Ratio, Modifier to Matrix | 36:64 | |
| Curing | 24 hours at ambient conditions | |
|  | 15 hours oven drying at 80° C. | |
|  | 15 hours oven drying at 125° C. | |
|  | 15 hours oven drying at 400° C. | |
| Flexural Strength After cure | 2700 psi | |

Figure 3:
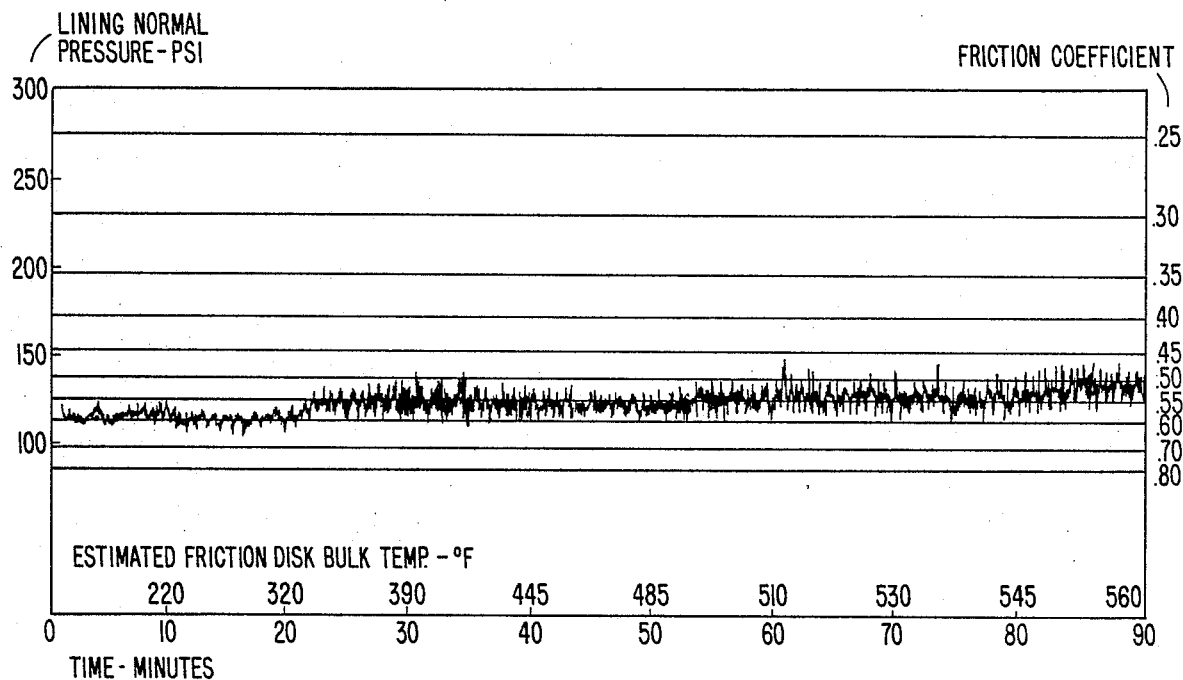

FIG. 3 shows the results of a test of this composition as a brake pad in a "F.A.S.T" tester.

EXAMPLE 6

|  | Weight Percent | Volume Percent |
|---|---|---|
| Matrix Material | | |
| Sodium Hexametaphosphate | 15.1 | 16.1 |
| Alumina Cement | 27.1 | 23.9 |
| Calcined Alumina | 9.1 | 6.1 |
| Water | 11.4 | 30.3 |
| Friction Modifiers | | |
| Steel Fiber | 23.1 | 7.9 |
| Graphite | 7.5 | 9.1 |
| Petroleum Coke | 0.9 | 1.2 |
| Silicon Carbide | 2.4 | 2.0 |
| Carbon Black | 3.5 | 4.2 |
| Weight Ratio, Modifier to Matrix | 37:63 | |
| Curing | 24 hours at ambient conditions | |
|  | 15 hours oven drying at 80° C. | |
|  | 15 hours oven drying at 125° C. | |
|  | 4 hours oven drying at 400°C. | |
| Flexural Strength | 2170 psi | |

|  | Weight Percent | Volume Percent |
| --- | --- | --- |
| After cure | | |

Figure 4:
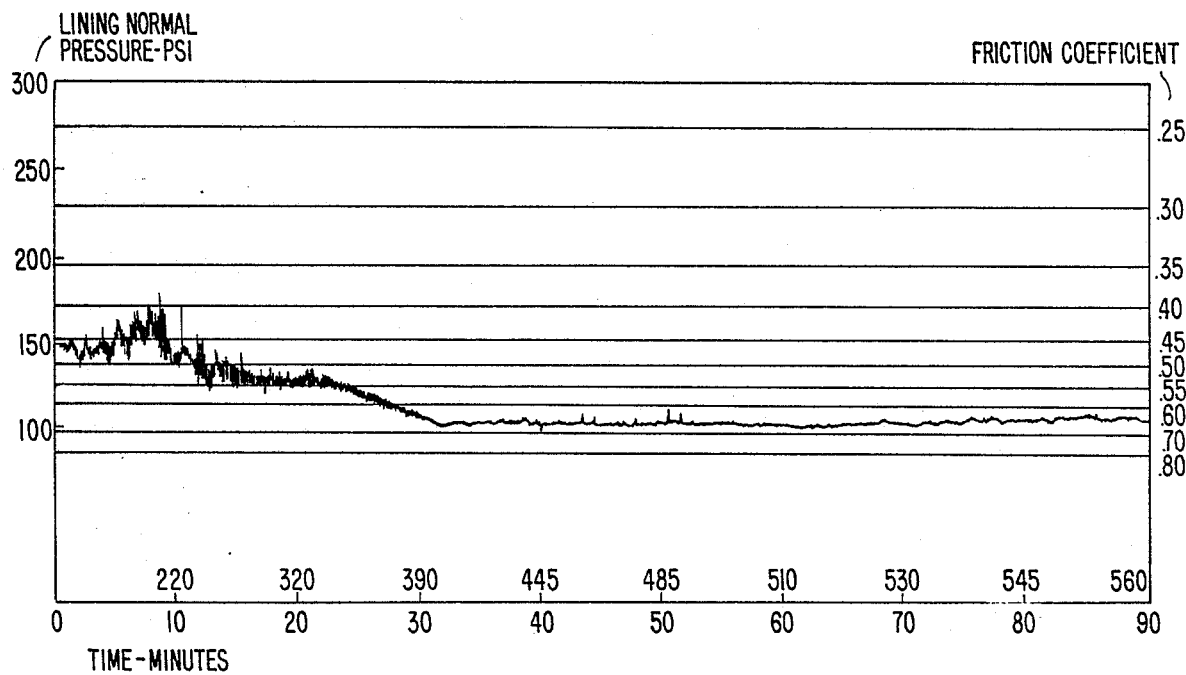

FIG. 4 shows the results of a test of this composition as a brake pad in a "F.A.S.T" tester.

EXAMPLE 7

|  | Weight Percent | Volume Percent |
| --- | --- | --- |
| Matrix Material | | |
| Sodium Hexametaphosphate | 15.3 | 16.1 |
| Alumina Cement (Secar 71) | 27.5 | 23.3 |
| Calcined Alumina | 9.2 | 6.1 |
| Water | 11.5 | 30.3 |
| Friction Modifiers | | |
| Steel Fiber | 23.5 | 7.9 |
| Graphite | 7.6 | 9.1 |
| Petroleum Coke | 0.9 | 1.2 |
| Nitrile Rubber | 0.9 | 2.0 |
| Carbon Black | 3.5 | 4.2 |
| Weight Ratio, Modifier to Matrix | 36:64 | |
| Impregnation | | |
| Impregnation with high temperature NOVALAC EPOXY | | |
| Curing | 24 hours at ambient conditions | |
| | 15 hours oven drying at 80° C. | |
| | 15 hours oven drying at 125° C. | |
| | 15 hours oven drying at 400° C. | |
| | Impregnation at 200° C. | |
| Flexural Strength After cure | 8530 psi | |

EXAMPLE 8

|  | Weight Percent | Volume Percent |
| --- | --- | --- |
| Matrix Material | | |
| Sodium Hexametaphosphate | 12.5 | 14.0 |
| Polyethyleneimine | 1.1 | 2.6 |
| Magnesium Oxide (Coarse) | 38.3 | 29.8 |
| Magnesium Oxide (Fine) | 5.0 | 3.9 |
| Water | 8.9 | 24.9 |
| Friction Modifiers | | |
| Steel Fiber | 22.1 | 7.9 |
| Graphite | 7.1 | 9.1 |
| Petroleum Coke | 0.8 | 1.2 |
| Nitrile Rubber | 0.8 | 2.0 |
| Carbon Black | 3.3 | 4.6 |
| Weight Ratio, Modifier to Matrix | 34:66 | |
| Curing | 24 hours at ambient conditions | |
| | 15 hours oven drying at 80° C. | |
| | 15 hours oven drying at 125° C. | |
| Flexural Strength After cure | 4030 psi | |

EXAMPLE 9

|  | Weight Percent | Volume Percent |
| --- | --- | --- |
| Matrix Material | | |
| Alumina Cement | 27.2 | 21.0 |
| Wollastonite | 26.1 | 21.1 |
| Polyvinylpyrrolidone | 5.4 | 10.6 |
| Water | 10.8 | 25.3 |
| Friction Modifiers | | |
| Mullite | 30.0 | 22.0 |
| Weight Ratio, Modifier to Matrix | 30:60 | |
| Curing | 24 hours at ambient conditions | |
| | 15 hours oven drying at 80° C. | |
| | 15 hours oven drying at 200° C. | |

|  | Weight Percent | Volume Percent |
| --- | --- | --- |
| Flexural Strength After cure | Fired to 1450° C. 12150 psi | |

In the compositions of the invention, the friction modifier and matrix can be used in the following weight proportions:

|  | Weight % | | Volume % |
| --- | --- | --- | --- |
|  | Broad | Preferred |  |
| Matrix | 40–80 | 55–70 | 70–78 |
| Friction Modifiers | 60–20 | 45–30 | 30–22 |

More specifically the proportions of the various friction modifiers when present are as follows, it being understood that the total comprises about 40% of the composite:

|  | Broad (Weight %) | Narrow (Weight %) |
| --- | --- | --- |
| Steel Fiber | 0–35 | 20–30 |
| Graphite | 0–15 | 5–10 |
| Petroleum Coke | 0–5 | 0.5–2 |
| Cashew Nut Shell Resin | 0–5 | 2–3 |
| Molybdenum Disulphide | 0–15 | 5–8 |
| Magnesium Oxide | 0–5 | 2–3 |
| Barytes | 0–5 | 2–3 |
| Nitrile Rubber | 0–5 | 0.5–15 |
| Carbon Black | 0–10 | 2–5 |
| Silicon Carbide | 0–5 | 2–3 |
| Mullite | 0–40 | 25–35 |

We claim:

1. In a friction composition comprising a hydraulic cement matrix and friction modifying substance, the improvements which comprise utilizing as the matrix a high strength hydraulic cement which when cured exhibits a compressive strength of at least 15,000 psi and a flexural strength of at least 1,500 psi, and utilizing as the friction modifying substance at least one of each of the following classes of materials: fibers, dry lubricants and fillers; which composition better retains its effectiveness at the temperatures encountered in normal service and permits more extended service use as compared with friction materials in which the matrix is a phenolic resin or a lower strength hydraulic cement.

2. The composition of claim 1 wherein the relative proportion of matrix to friction-modifying substance is from about 70:30 to 55:45 by weight.

3. The composition of claim 1 wherein the friction-modifying substance comprises steel fibers, graphite, petroleum coke, nitrile rubber and cashew nut shell resin.

4. The composition of claim 1 wherein the friction-modifying substance comprises steel fibers, graphite, petroleum coke, nitrile rubber and carbon black.

5. The composition of claim 1 wherein the friction-modifying substance comprises steel fibers, nitrile rubber, cashew nut shell resin, molybdenum disulfide, magnesium oxide and barytes.

6. The composition of claim 1 wherein the relative proportion of matrix to friction-modifying substance is from about 78:22 to 70:30 by volume.

7. A friction element produced by curing the composition of claim 1.

8. A friction element produced by curing the composition of claim 3.

9. A friction element produced by curing the composition of claim 4.

10. A friction element produced by curing the composition of claim 5.

* * * * *